UNITED STATES PATENT OFFICE.

HOWARD SPENCE AND THOMAS JOHN IRELAND CRAIG, OF MANCHESTER, ENGLAND, ASSIGNORS TO COMPANY OF PETER SPENCE & SONS LIMITED, OF MANCHESTER, ENGLAND.

SOLUTION OF SODIUM ALUMINATE.

1,157,436. Specification of Letters Patent. Patented Oct. 19, 1915.

No Drawing. Application filed August 18, 1914. Serial No. 857,313.

*To all whom it may concern:*

Be it known that we, HOWARD SPENCE and THOMAS JOHN IRELAND CRAIG, both subjects of the King of Great Britain and Ireland, and both residents of Manchester, in the county of Lancaster, England, have invented new and useful Solutions of Sodium Aluminate, of which the following is a specification.

The employment of solutions of sodium aluminate in the arts is hindered by their instability on keeping. It is known that these solutions are increasingly stable with an increasing ratio of sodium to aluminum and that strong solutions are more stable than weaker ones. For use in the arts it is desirable to employ solutions with as low a ratio as practicable of sodium to aluminum, *e. g.*, a molecular ratio of about 1.25 $Na_2O$ to 1 $Al_2O_3$ is advantageous. Such solutions however, except at very high concentrations, *e. g.* at specific gravities of about 1.5 to 1.6, are very unstable. Thus at specific gravities of about 1.15 to 1.25 such solutions in about a day show considerable decomposition by spontaneously precipitating alumina hydroxid, their effective employment under technical conditions being thus materially limited.

According to this invention a solution of sodium aluminate contains an added substance which will prevent the spontaneous precipitation of alumina hydroxid which would otherwise take place in such solution. Such substance must also possess the quality of not prejudicially affecting the solution for the purpose for which it is to be used in the arts. Substances suitable for use in carrying this invention into effect will be hereinafter included in a reference to a substance which inhibits the spontaneous precipitation of alumina hydroxid. Examples of such substances are sugar, dextrin, starch or other suitable carbo-hydrates, glycerin, phenols, gelatin or other colloidal substances, or saccharates, tartrates, or other suitable organic salts.

The following is an example of the production of a stable solution of sodium aluminate according to this invention. A solution of sodium aluminate having a low ratio of soda to alumina and a specific gravity of about 1.45 to 1.55 in the cold is treated at 100° C. with a proportion of sugar equal to about one half to one and a half per cent on the weight of the solution, and the heat maintained for about two hours. The solution, after the treatment is completed, will be free or substantially free from any liability to spontaneously precipitate alumina hydroxid, and is, consequently, of high stability. It can be diluted for use under ordinary conditions without risk of material precipitation of alumina hydroxid in the dilute solution for a prolonged period.

What we claim is:—

A solution of sodium aluminate containing an added substance which inhibits the spontaneous precipitation of alumina hydroxid and is not prejudicial to the solution for the purpose for which it is to be used, substantially as set forth.

In witness whereof we have hereunto set our hands in the presence of two subscribing witnesses.

HOWARD SPENCE.
THOMAS JOHN IRELAND CRAIG.

Witnesses:
ERNALD SIMPSON MOSELEY,
FRANK ATLEYS.